Figure 1:
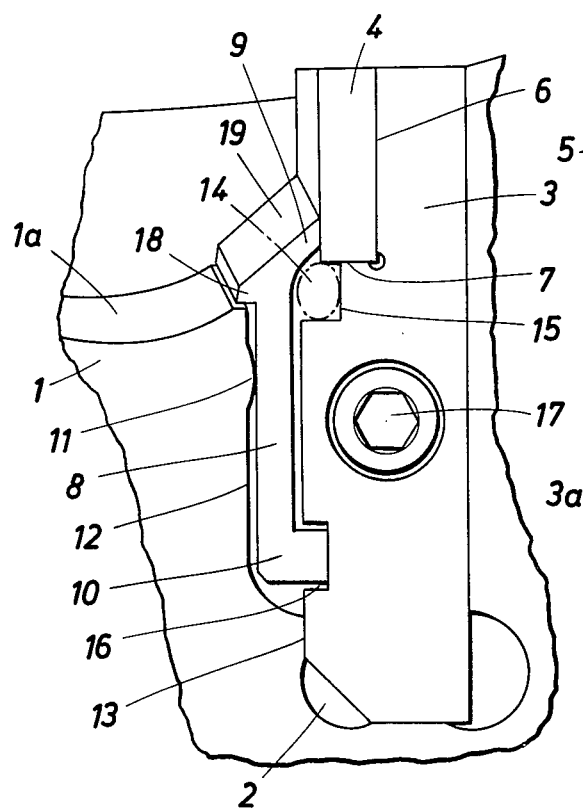

United States Patent [19]

Kralowetz et al.

[11] 4,201,500
[45] May 6, 1980

[54] PROFILE MILLING CUTTER FOR A CIRCULAR MILLING OF CYLINDRICAL PORTIONS OF CRANKSHAFTS

[75] Inventors: Bruno Kralowetz, Steyr; Peter Kirchberger, Haag, both of Austria

[73] Assignee: GFM Gesellschaft für Fertigungstechnik und Maschinenbau Aktiengesellschaft, Steyr, Austria

[21] Appl. No.: 951,053

[22] Filed: Oct. 12, 1978

[30] Foreign Application Priority Data

Oct. 19, 1977 [AT] Austria .............................. 7470/77

[51] Int. Cl.² .............................................. B26D 1/12
[52] U.S. Cl. ........................................... 407/43; 407/5; 407/46; 407/50; 407/70; 407/100; 407/101; 407/109
[58] Field of Search .................. 407/41, 46, 50, 60, 407/101, 108, 109, 5, 31, 43, 70, 100

[56] References Cited

U.S. PATENT DOCUMENTS

| | | | |
|---|---|---|---|
| 2,203,104 | 6/1940 | Reaney | 407/109 |
| 3,200,474 | 8/1965 | Kralowetz | 407/60 |
| 3,505,715 | 4/1970 | Germani | 407/108 |
| 3,578,742 | 5/1971 | Manthei | 407/41 |
| 3,816,893 | 6/1974 | Farrow | 407/40 |
| 3,854,511 | 12/1974 | Maier | 407/48 |
| 3,913,645 | 10/1975 | Maier | 407/50 |
| 3,957,094 | 5/1976 | Maier | 407/48 |

*Primary Examiner*—Leonidas Vlachos
*Attorney, Agent, or Firm*—Kurt Kelman

[57] ABSTRACT

A disc-shaped cutter body (1; 101; 201) is provided with a multiplicity of tooth plates (4; 104; 204, 204a), which engage suitable backing and end-supporting surfaces (5, 6, 7; 105, 106, 107, 205, 205a, 206, 206a, 207, 207a) of tooth holders (3; 103; 203) inserted in recesses formed by radial grooves (2; 102; 202) in the cutter body. Each tooth plate is clamped between a tooth holder and a head portion (9; 109; 209a, 209b) of an elongated holding-back member (8; 108; 208), which has a foot portion (10; 110; 210) that is disposed in the recess of the cutter body and bears on said tooth holder. To enable the tooth plates to be reliably fixed in a narrow cutter body by means which involve only a small expenditure and with a controlled clamping force and to facilitate the handling of the tooth plates and the means for fixing them, each tooth plate (4; 104; 204, 204a) is held in position by the head portion (9; 109; 209; 209a) of a resilient holding-back member (8; 108; 208), which between its head and foot portions bears on a surface (12; 112; 212) of the recess in the cutter body.

12 Claims, 9 Drawing Figures

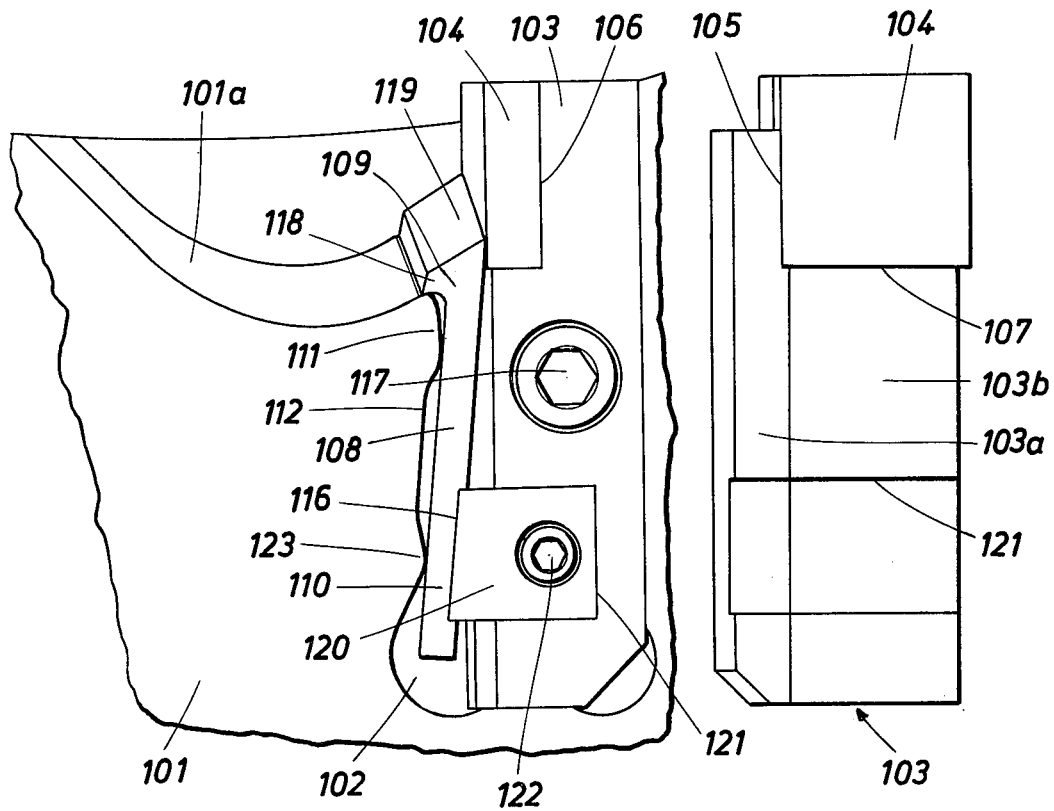

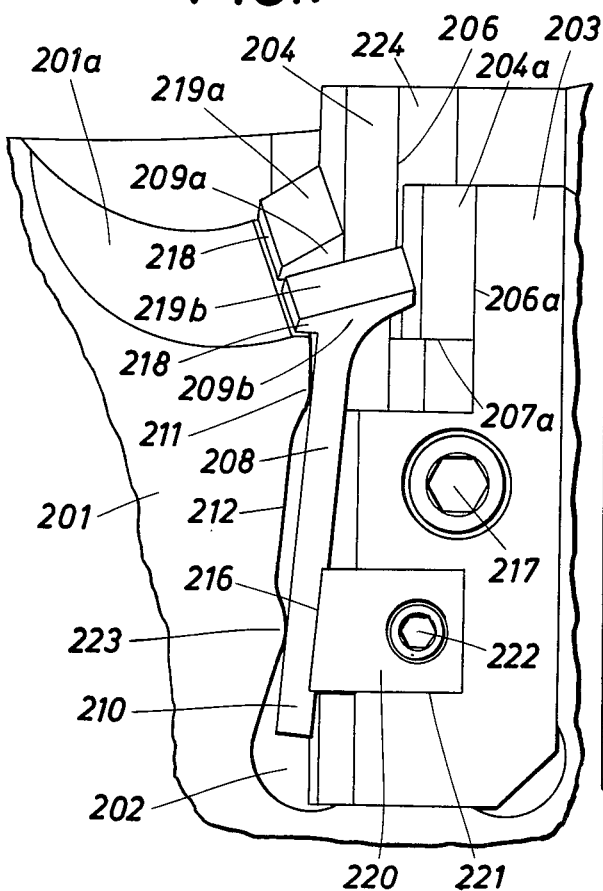
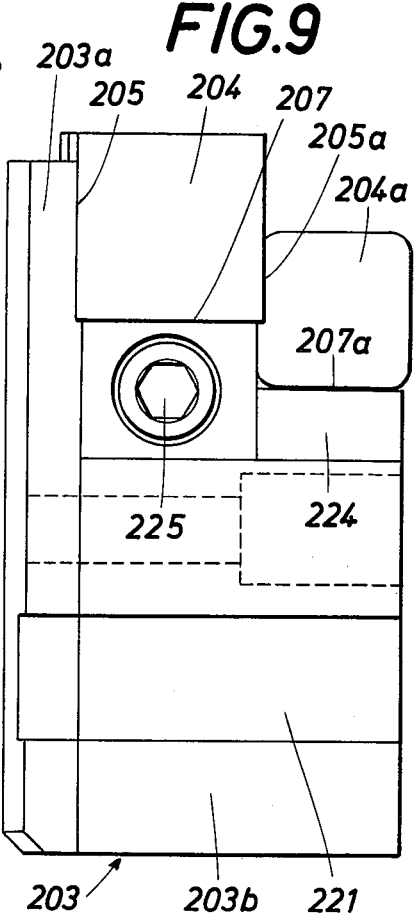
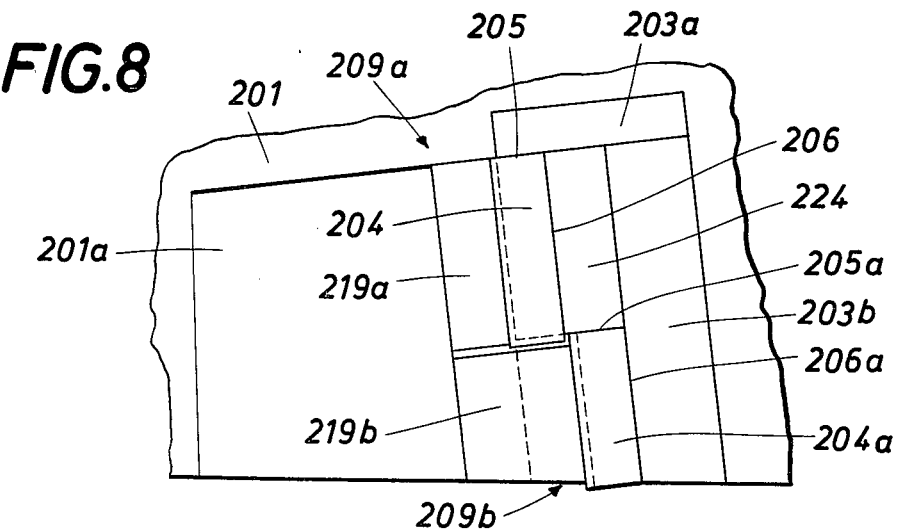

PROFILE MILLING CUTTER FOR A CIRCULAR MILLING OF CYLINDRICAL PORTIONS OF CRANKSHAFTS

This invention relates to a profile-milling cutter for a circular milling of cylindrical portions of crankshafts, comprising a disc-shaped cutter body, a multiplicity of tooth plates replaceably carried by said cutter body, and tooth holders, which are inserted in radial grooves in the cutter body and have end-supporting and backing surfaces supporting said tooth plates, each of which is clamped between a tooth holder and a head portion of an elongated holding-back member, which has a foot portion disposed in the groove of the cutter body and bearing on the tooth holder.

In most of the known profile-milling cutters, the tooth plates have been supported at their radially inner ends in the grooves of the cutter body an end-supporting blocks and forced by means of clamping wedges against tooth holders, which have lateral and rear backing surfaces engaging the tooth plates to hold them in position. Relatively large radial grooves are required in the cutter body for this fixation of the tooth plates so that only a relatively small number of tooth plates can be accommodated on the periphery of the cutter body. On the other hand, the edge life of the milling cutter increases with the number of tooth plates carried by it and for this reason a milling cutter provided with a large number of tooth plates is desirable. Besides, the manufacture of the components and the provision of the mating surfaces which are required requires much involves a high expenditure of labor.

It has been attempted to fix the tooth plates by space-saving means consisting of tooth holders which are formed not only with the backing surfaces but also with the end-supporting surfaces and in which the tooth plates are held as in a cassette. When the tooth plates have been inserted into the tooth holders, the latter are simply inserted into the recesses of the cutter body. For this purpose the tooth holder and the recess in the cutter body must conform to each other in cross-section. Whereas the recesses in the cutter body may be small in that case, they must be machined most carefully on all sides. Besides, the tooth plates must be fixed with screws to the tooth holders and the latter must be fixed with screws in the recesses of the cutter body. This requires a high manufacturing and machining expenditure and involves the risk that the screws may be loosened by the vibrations which are generated during the milling operation. Besides, it is most difficult and time-consuming to invert and replace the tooth plates because for this purpose it is necessary in most cases to lift the tooth holders out of the recesses before the crews for fixing the tooth plates can be loosened. The tooth holders can be lifted out of the recesses of the cutter body only with difficulty because the tooth holders are a close fit in said recesses. An additional disadvantage resides in that the screwed joints tend to become worn and enable an adjustment of the tooth plates only with difficulty. Besides, the tooth plates and clamping plates must be provided with bores for the fixing screws and numerous fits must be provided.

It has also been suggested to fix the tooth plates by means of elongated holding-back members, which are disposed beside the tooth holders in such a manner that the tooth plates are clamped between the head portion of the tongue and the tooth holder. In accordance with that proposal the holding-back member is riveted to the tooth holder with supporting blocks interposed and the head portion of the holding-back member together with the bearing block and the tooth holder define merely a pocket for receiving the tooth plate. The latter is clamped in that case only by means additional clamping wedges, which are provided in the recesses of the cutter body and can be tightened by means of threaded bolts, which are accessible on the same side as the chip-guiding surface. For this reason the design just described is complicated and require large recesses in the cutter body and suffers also from the disadvantage of a conventional fixation with wedges or screws.

In all known fixing means for tooth plates, whether the latter are fixed by means of clamping wedges or directly or indirectly by means of screws, the clamping forces cannot be sufficiently controlled so that in use the tooth plates are often urged against the associated supposing surfaces a force which is stronger or weaker than desired. This has often resulted in a fracture of the tooth plates or in a shifting thereof from their adjusted position.

It is an object of the invention to eliminate these disadvantages and to provide a profile milling cutter which is of the kind described first hereinbefore and has a cutter body that is small in size and can be manufactured at low cost and permits of a simple, reliable and exact fixation of the tooth plates.

In accordance with the invention this object is accomplished in that the tooth plate is resiliently held by the head portion of the holding-back member, which in the portion between its head and foot portions bears on the surface of the recess, preferably at a protruding bulge. Because the holding-back member exerts a spring force and is stressed by bearing on the surface of the recess and on the tooth plate and tooth holder, the holding-back member locates in a simple manner the tooth plate in the tooth holder and the latter in the recess of the cutter head. The resilient clamping of the tooth plate and tooth holder cannot be loosened even by strong vibrations in the cutter body or when the tooth plates are rhythmically loaded as they cut. This resilient clamping also permits of a quick and axact adjustment. It ensures at any time a reliable fixation by a properly controlled clamping force because the stress induced in the holding-back member depends on its spring properties and on its supports and results in a sufficiently strong clamping force. On the other hand, an excessive pressure is prevented by the resiliency of the holding-back member. The holding-back member may consist of a thin spring plate so that the recess in the cutter body need not be much wider than the tool holder. This permits of a design of a cutter which is narrow and affords the additional advantage that the said surface of the recess in the cutter body as well as the side face of the tooth holder facing said surface of the recess require virtually no special machining because the provision of the holding-back member eliminates the need for mating surfaces. Any inaccuracies will be compensated without difficulty by the resiliency of the holding-back member. As one and the same holding-back member is used to clamp the tooth plate and tooth holder in position, it will be sufficient to load and relieve the holding-back member when it is desired to invert or replace the tooth plates or to insert and remove the tooth holders, which are a loose fit in the recesses when the holding-back member is relieved. These operations can be performed quickly and without any complication. The holding-back members can preferably be handled by means of a cam-like tool, which can be introduced between the holding-back member and the tooth holder and can then be rotated to disengage the head portion of the holding-back member from the tooth plate. There is no need for bores in the tooth plates and for expensive fixing screws, which are liable to be worn. The holding-back member may consist of a hot-formed spring steel plate and contrary to clamping wedges is a wearing member which can easily be made and can be replaced quickly.

In high-performances milling cutters required to exert strong cutting forces, it will be desirable, in accordance with a further feature of the invention, to provide adjacent to the bottom of the recess a surface portion for engaging the tooth holder in that surface of the recess in the cutter body which faces the holding-back member. That engaging surface portion extends only over a small part of the radial depth of the recess, namely, from the bottom of the recess to the lower end of the foot portion of the holding-back member, and only slightly increases the manufacturing costs. On the other hand, the provision of this engaging surface portion and the member for holding-back the tooth holder ensures that the tooth plate and tooth holder are fixed particularly firmly in the recess of the cutter body so that they can take up even very great cutting forces.

According to another desirable feature of the invention, the foot portion of the holding-back member bears on the tooth holder by means of a generally radial wedge, which is preferably quided on the tooth holder and which is longitudinally adjustable and accessible for adjustment from the end face of the cutter body, e.g., by a rotation of a threaded bolt which is accessible from said end face. In this way the stress of the holding-back member and the clamping force exerted by it can be varied in adaption to the specific operation conditions of the milling cutter. Because the wedge may protrude only slightly from its guide in the tooth holder, it does not involve a substantial increase in width.

According to a preferred feature of the invention, that surface of the recess which faces the holding-back member is formed with a second bulge, which registers with the wedge in the peripherals direction and bears on the holding-back member only after the wedge has been tightened. As soon as the holding-back member bears also on the second bulge, the wedge acts on the tooth holder like a true clamping and the spring properties of the holding-back member can be used only to retain the tooth plate. A particularly stable mounting of the tooth plate and tooth holder is achieved in this manner.

When the tooth holder has been exactly adjusted in recess of the cutter head, it is not desired to re-adjust the tooth holder whenever a tooth plate has been replaced. The need for such re-adjustment is eliminated in accordance with the invention in that the tooth holder is fixed in the recess of the cutter body by a retaining screw which is accessible at the end face.

According to a further feature of the invention the tooth holder consists of two parts, which are interconnected by the retaining screw, one of said parts is formed with the end-supporting surface and the rear backing surface and the other part is formed with the lateral backing surface. In such a two-part tooth holder, the end-supporting surface and the lateral and rear backing surfaces can be machined much more easily because each of said surfaces extends throughout the respective side of the respective part. The holding-back member and the retaining screw hold the two parts of the tooth holder together without need for additional parts.

If two tooth plates are associated with each tooth holder and bifurcated holding-back members are used, which have one foot portion and two head portions, the forked holding-back member may be provided in accordance with the invention with two head portions which differ in size and respectively engage two tooth plates, which are axially juxtaposed and offset relative to each other in the peripheral direction and engage a common insert, which is in making engagement with end-supporting and backing surfaces of a tooth holder body, which is formed with the lateral backing surface for the axially inner tooth plate and with the rear backing surface for the axially outer tooth plate whereas the insert is formed with the lateral backing surface for the axially outer tooth plate, the end-supporting furfaces for both tooth plates, and the rear backing surface for the axially inner tooth plate. Owing to the offset arrangement of the two tooth plates, the cutting forces will be exerted in succession, as is desired, chips can be removed without difficulty, and the two tooth plates can be fixed by means of a common holding-back member and an insert which is formed with end-supporting and backing surfaces which extend throughout the respective side so that they can easily be machined.

To prevent an ingress of chips into the recesses, the head portions of the holding-back members are desirably provided with an extension, which is directed toward the chip-guiding surface of the cutter body and cover the radially outer opening of the associated recess of the cutter body. As a result, the recesses are closed and chips are removed satisfactorily.

Figure 3:
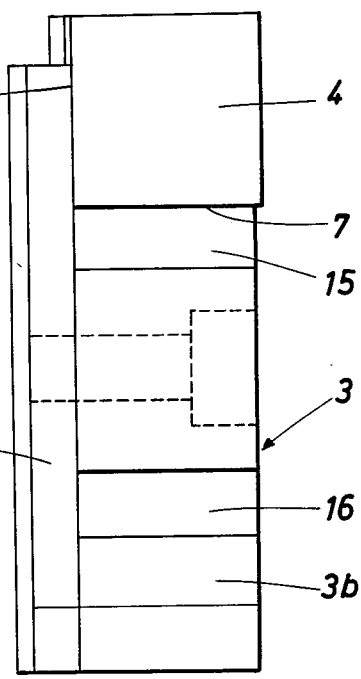
Figure 2:
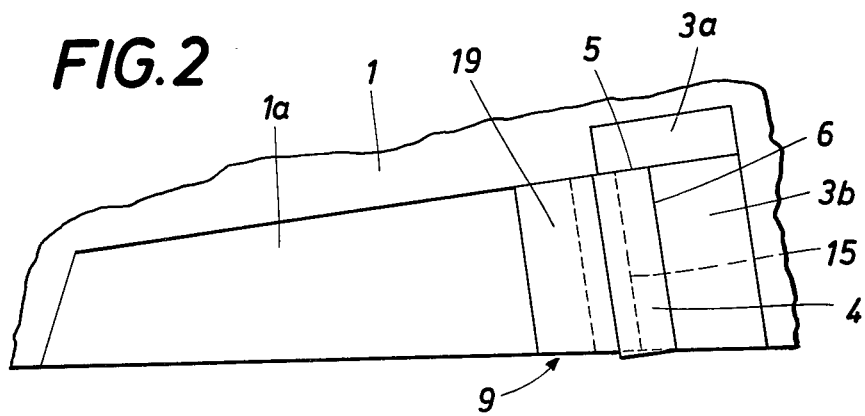

Embodiments of the invention are shown by way of example on the accompanying disgrammatic drawings, in which FIGS. 1 and 2 are, respectively, a fragmentary end view and a fragmentary top plan view showing a recess in a cutter body and a tooth plate inserted in said recess, FIG. 3 is an elevation showing the tooth holder and tooth plate of FIGS. 1 and 2 viewed opposite to the direction of rotation of the cutter body, FIGS. 4 to 6 are respective similar views showing another embodiment and FIGS. 7 to 9 are respective similar views showing an embodiment having two tooth plates in each recess.

It is desirable to secure as many tooth plates as possible to a cutter body of a profile milling cutter reliably and in a simple manner. To that end, the embodiment shown in FIGS. 1 to 3 comprises a disc-shaped cutter body 1 having recesses 2 in the form of radial grooves. Cassettelike tooth holders 3 for holding tooth plates 4 are mounted in said recesses. Each tooth holder has a lateral backing surface 5, a rear backing surface 6 and an end-supporting surface 7 for engaging the associated tooth plat 4. A holding-up member 8 is provided in each recess 2 of the cutter body and serves to secure the tooth plate 4 to the tooth holder 3 and to clamp the tooth holder 3 in the recess 2 of the cutter head. The holding-back member 8 is disposed in the recess 2 of the cutter body on that side of the tooth holder which faces the tooth plate 4. The holding-back member has an outer or head portion 9, which bears on the tooth plate 4, and also has an inner foot portion 10, which directly bears on the tooth holder 3. Between the head and foot portions the holding-back member 8 bears on a bulge 11 formed in a surface 12 which defines the recess 2. It will be understood that the bulge might be alternatively formed on the holding-up member. In order to prevent a tilting of the tooth holder under the action of strong cutting forces, the surface 12 has near the bottom of the recess 2 a surface portion 13, which engages the tooth holder 3. When it is desired to release the clamped tooth plate 4, the head portion 9 of the holding-up member 8 is disengaged from the tooth plate 4 by means of a cam-like tool 14, which is introduced between the holding-back member and tooth holder and while bearing on a backing surface 15 of the tooth holder is rotated through 90°. As a result, the head portion 9 of the holding-up member disengages and thus releases the tooth plate 4. When the tooth plate 4 is then removed and the tool 14 is removed before the tooth plate 4 or another one has been inserted, the holding-up member 8 will be relieved and the tooth holder 3 will be released and can be removed. To prevent a relieved holding-back member from falling out of the recess 2 when the same faces downwardly, the tooth holder 3 is provided with a recess 16, which receives the foot portion 10 of the holding-back member 8 and also ensures that the holding-back member will engage the tooth holder 3 at a defined point. To ensure that a loosening of the tooth plate 4, e.g. for a replacement, will not change the adjusted position of the tooth holder 3, the latter is located in the recess 2 also by a retaining screw 17. An ingress of chips into the recess 2 is avoided in that the radially outer opening of the recess is covered by the head portion 9 of the holding-back member. For that purpose the head portion 9 has an extension 18 directed toward the chip-guiding surface 1a. Besides, the surface 19 of the head portion 9 is designed as a chip breaker in order to improve the flow of chips. To facilitate the machining of the tooth holder 3 at the backing and end-supporting surfaces for the tooth plate 4, the tooth holder consists of two parts 3a, 3b, which are jointly fixed by the retaining screw 17 to the cutter body. One part 3a is formed with the lateral backing surface 5 and the other part 3b with the end-supporting surface 7 and the rear backing surface 6. As a result, each backing and end-supporting surface extends throughout the respective side of the respective part so that the machining is much simplified.

In the embodiment of the invention shown in FIGS. 4 to 6, the foot portion 110 of the holding-back member 108 bears on a wedge 120 rather than directly on the tooth holder 103. The wedge 120 is mounted in a guide 121 of the tooth holder and is adjustable by means of a tightening screw 122, which is accessible at the end face of the cutter body. The surface 112 of the recess 102 in the cutter body is formed with two bulges 111, 123, which are associated with the holding-back member. The bulge 111 becomes effective first as the wedge 120 is tightened and is disposed near the head portion 109 of the holding-back member. The other bulge 123 becomes effective after the bulge 123 and virtually replaces the bearing surface 13 of FIG. 1 and registers with the wedge 120 in the peripheral direction. It will be understood that the bulges 111, 123 may be formed on the holding-up member 108 rather than on the surface 112 of the recess 102 of the cutter body. The wedge 120 can be adjusted to stress or relieve the holding-back member so that the tooth plate 104 and the tooth holder 103 can be fixed or released. When the holding-back member 108 is stressed, force transmitted in a closed path causes the tooth plate 104 to be urged against the tooth holder by the spring force of the holding-back member and the tooth holder to be clamped in the recess of the cutter body by the clamping force of the wedge 120, which cooperates with the bulge 123. That transmission of force is eliminated when the wedge 120 is withdrawn so that the tooth plate 104 and the tooth holder 103 are released.

In this embodiment the holding-back member 108 has a recess 116, which receives the wedge 120 so that the latter holds the holding-back member in position. The head portion 109 of the holding-back member has an extension 118, which extends toward the chip-guiding surface 102a of the cutter body 101 and covers the radially outer end of the recess. The surface 119 serves as a chip breaker. The tooth holder is held in position by a retaining screw 117, which also holds together the parts 103a, 103b of the tooth holder, which are formed with backing and end-supporting surfaces 105, 106, 107 extending throughout the respective side of the respective part.

To enable the use of a single tooth holder and a single holding-back member for clamping two tooth plates at the same time rather than for clamping only a single tooth plate as shown in FIGS. 1 to 3 and 4 to 6, the embodiment shown in FIGS. 7 to 9 comprises a holding-back member 208, which at its radially outer end is bifurcated so that it has a single foot portion 210 and two head portions 209a, 209b, which are separated by a slot and associated with respective tooth plates 204, 204a. To enable said two tooth plates 204, 204a to be properly arranged and supported, the tooth holder comprises a tooth holder body 203 and a tooth holder insert 224, which is secured to the tooth holder body 209 by a grooved dowel pin or a screw and fits associated backing and end-supporting surfaces of the tooth holder body 203 and together with the latter holds both tooth plates 204, 204a in position. The tooth holder body 203 consists of two parts, namely, a part 203a formed with a lateral backing surface 205 for the inner tooth plate 204 and a part 203b formed with a rear backing surface 206a for the outer tooth plate 204a. The insert 224 is formed with the end-supporting surfaces 207 and 207a for both tooth plates 204, 204a, a rear backing surface 206 for the inner tooth plate 204 and a lateral backing surface 205a for the outer tooth plate 204a. Owing to this provision of the backing and end-supporting surfaces on the body and insert of the tooth holder, the backing and end-supporting surfaces can be machined in a simple manner. The provision of two head portions 209a, 209b and of the insert 224 permits the use of one and the same holder body 203 and one and the same holding-up member 208 for properly securing two tooth plates 204, 204a in the cutter body 201, 204, 204a without difficulty and in such a manner that the retaining forces acting on the two tooth plates are independent from each other. The two head portions and the insert can be designed so that the two tooth plates are offset from each other. As a result, the cutting forces do not occur simultaneously and the chips can be removed satisfactorily. In the present embodiment, each of the two head portions 209a, 209b has a surface 219a, 219b which serves as a chip breaker, and an extension 218, which extends toward the chip-guiding surface 201a and covers the recess 202. Only a single wedge 220 is associated with the holding-back member 208 and is mounted in a guide 221 of the tooth holder body and adjustable by a tightening screw 222. The wedge engages a recess 216 of the holding-back member 208 and the latter bears on two bulges 211, 223 on the surface 212 of the recess. The holding-back member 208 is held in position by a retaining screw 217, which also holds the wo parts 203a, 203b of the tooth holder body together.

The use of a single holding-back member for holding the tooth holder and tooth plate or plates in position results in a space-saving arrangement, which is functionally reliable, can easily be handled, and involves only low manufacturing costs.

We claim:

1. A profile milling cutter for a circular milling of an outside surface of a workpiece, comprising
    a disc-shaped cutter body having an end face, a peripheral surface and a plurality of recesses consisting of radial grooves formed in said end face and open at said peripheral surface, each of said recesses having a leading side face and having an adjacent chip guiding surface,
    a plurality of tooth holders disposed in respective ones of said recesses, each of said tooth holders having at least one end-supporting surface, at least one lateral backing surface, and at least one rear backing surface facing said leading side face and peripherally spaced therefrom,
    a plurality of tooth plates, at least one of which extends in each of said recesses and is peripherally spaced from said leading side face and in engagement with said end-supporting surface and said lateral and rear backing surfaces of one of said tooth holders, and
    a plurality of elongated resilient holding-back members, each of which is disposed in one of said recesses and has a radially inner foot portion held between said leading side face of said one recess and one of said tooth holders, a radially outer head portion resiliently urging one of said tooth plates against said rear backing surface of one of said tooth holders, and an intermediate portion bearing on said leading side face of said one recess.

2. A profile milling cutter as set forth in claim 1, which is adapted to mill the outside surface of a cylindrical portion of a crankshaft.

3. A profile milling cutter as set forth in claim 1, in which one of said leading side face and said holding-back member are formed with a bulge at which said intermediate portion of said holding-back member engages said leading side face.

4. A profile milling cutter as set forth in claim 1, in which each of said leading side faces extends radially inwardly beyond said foot portion of the associated holding-back member and radially inwardly of said foot portion engages the associated tooth holder.

5. A profile milling cutter as set forth in claim 1, in which each of said recesses contains a wedge, which extends generally radially between and engages the associated holding-up member and the associated tooth holder and is longitudinally adjustable and accessible for longitudinal adjustment from said end face.

6. A profile milling cutter as set forth in claim 5, in which said tooth holder is provided with means for longitudinally guiding said wedge.

7. A profile milling cutter as set forth in claim 5, in which
    one of said leading side face and said holding-back member are formed with a radially outer bulge and a radially inner bulge,
    said holding-back member engages said leading side face at said inner and outer bulges,
    said radially inner bulge registers with said wedge in the peripheral direction, and
    said holding-up member is arranged to disengage from said leading side face at said inner bulge in response to a sufficient radially inwardly directed movement of said wedge.

8. A profile milling cutter as set forth in claim 7, in which each of said tooth holder comprises means for guiding one of said wedges in its longitudinal direction.

9. A profile milling cutter as set forth in claim 1, in which each of said tooth holders is held in the associated recess by a retaining screw, which is exposed at said end face.

10. A profile milling cutter as set forth in claim 9, in which
    each of said tooth holders comprises first and second parts,
    said first and second parts of each of said tooth holders are held together by one of said retaining screws,
    said first part is formed with said end-supporting and rear backing surfaces, and
    said second part is formed with said lateral backing surface.

11. A profile milling cutter as set forth in claim 1, in which
    said holding back member is bifurcated and has a single foot portion and two axially spaced apart head portions, which differ in size,
    said tooth holder comprises a tooth holder body disposed in said recess and an insert disposed in said recess between said tooth holder body and said holding-back member,
    said tooth holder body is formed with backing and end-supporting surfaces in mating engagement with said insert,
    two axially juxtaposed tooth plates consisting of an axially inner and an axially outer tooth plate extend in said recess and are peripherally offset from each other and engage respective ones of said two head portions of the associated holding-back member,
    said tooth holder body is formed with a lateral backing surface engaging said inner tooth plate and with a rear backing surface engaging said outer tooth plate, and
    said insert is formed with a lateral backing surface engaging said outer tooth plate, two end-supporting surfaces engaging respective ones of said tooth plates, and a rear backing surface engaging said inner tooth plate.

12. A profile milling cutter as set forth in claim 11, in which
    each of said tooth plates is disposed between one of said chip-guiding surfaces and the associated tooth holder and peripherally spaced from said one chip-guiding surface to define a gap therewith and
    each of said head portions bridges one of said gaps and has a radially outer surface leading from the associated tooth plate toward the adjacent chip-guiding surface.

* * * * *